Figure 1:
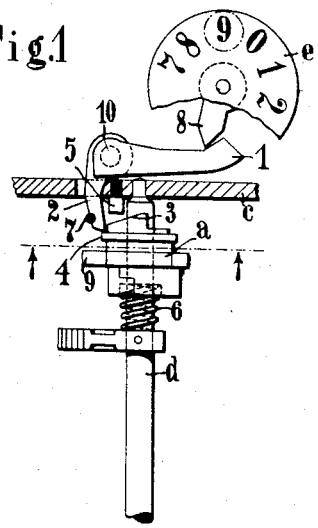

B. BEHR.
MEANS FOR THE TRANSMISSION OF TENS IN THOMAS CALCULATING MACHINES.
APPLICATION FILED MAR. 4, 1912.

1,041,231.  Patented Oct. 15, 1912.

UNITED STATES PATENT OFFICE.

BERNHARD BEHR, OF DRESDEN, GERMANY.

MEANS FOR THE TRANSMISSION OF TENS IN THOMAS CALCULATING-MACHINES.

1,041,231. Specification of Letters Patent. Patented Oct. 15, 1912.

Application filed March 4, 1912. Serial No. 681,509.

*To all whom it may concern:*

Be it known that I, BERNHARD BEHR, a subject of the Kingdom of Saxony, in the German Empire, residing at 19 Hamburgerstrasse, Dresden, have invented certain new and useful Improvements in Means for the Transmission of Tens in Thomas Calculating-Machines, of which the following is a specification.

This invention relates to means for the transmission of tens in calculating machines.

The transmission of tens in calculating machines was hitherto effected by depressing a detent, by means of a projection secured to a figure disk, on passing from 9 to 0 and 0 to 9, the movement of the detent being transmitted to the next highest figure disk, by lever mechanism. This lever-mechanism was adapted to move into the operative position, a segment which was movable on the shaft of the step cone but rotatable therewith, and which segment was provided with the operating arm. A cam surface on the front side of the segment engaged a stationary pin, so that on the further rotation of the shaft of the step cone, the segment and the arm connected thereto, were again moved into the position of rest and a further advance was prevented.

In this known device, it was necessary for the projection of the advancing disk to do the work that is necessary to overcome the considerable moment of friction, and weight of the lever mechanism, and to move the segment into the operative position. In consequence of the unfavorable proportions of levers and efficiency of the parts to be moved, and the fact that the advancing disk or the tooth secured thereto were under an excessive strain, the operation of the machine was periodic and heavy. The figure disk in all Thomas calculating machines is usually rotated by bevel-gear which is considerably smaller than the transmission tooth of the figure disk; otherwise the slight movement (1 to 1.5 mm.) of the detent, upon which the tooth of the figure disk operates, must be twice that of the sector.

It has previously been proposed to reduce the moments of weight to make the safety springs, which prevent a recoil, weaker, but the essential work of the transmission tooth, that is the movement of the segment, remain the same and how important this is, is shown in the following:

Usually, the crank of calculating machines has a speed of six revolutions per second, which corresponds to six revolutions of the figure-disk. Now as the figure-disk has ten figures, the transmission tooth of the figure-disk must carry out its operation in 1/60th of a second. If a number of transmission of tens occurs at the same time, there is a knocking-like operation, and a rapid wear of the parts.

Calculating machines are also known which can not be classed under the head of Thomas machines (as the characteristic steproller and the peculiar transmission of tens is omitted) in which the sleeve provided with finger for advancing the tens is moved into the operative position by a spring, but these are also differentiated from the present invention as the spring does not bring the segment or the operating finger into the operative position but is employed for effecting the transmission which, according to the present case, is effected by means of the crank.

The object of the present invention is to avoid the necessity of the transmission tooth of the figure disk doing any mechanical work, by bringing the segment into the operative position by special means, such for example as a spring, whereas operation of the transmission tooth of the figure disk is limited to keeping the spring in tension, and at the required moment, to release the spring which actually does the work. In this manner a more easy and uniform movement of the machine is obtained and there is less wear of the parts, and further, there is a simplification in the construction of the transmission means for the tens. Connecting rods, transmission levers and the springs which are usually employed, are omitted. The spring which is employed for moving the segment into operation is automatically tensioned each time (by a screw-surface). The re-tensioning of the spring is effected gradually and without any noticeable resistance, as the cam surface is disposed around the shaft. Whereas hitherto, it required considerable practice, and careful operation of the parts to bring the transmission of the tens into operation at the correct time, because on the slightest error this error would be multiplied; the lever proportions according to the present invention are so favorable, and the automatic transmission of tens is so advanageous that slight inaccuracies need not be regarded, and the assemblage which was hitherto so troublesome, is greatly simplified, and much cheaper, in consequence of the omission of the subsequent adjustment.

In the accompanying drawing is shown a constructional form of the invention.

Figure 2:
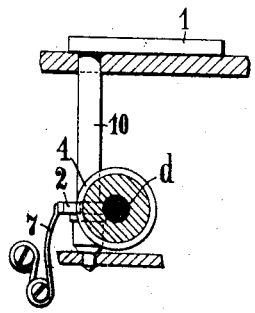

Figure 1 is a horizontal sectional view of one form of my invention the figure disk and the remaining parts being shown in plan and Fig. 2 is a plan section on line 2—2 of Fig. 1, looking in the direction of the arrows.

On the figure disk e is mounted in the usual manner, the transmission tooth 8. On the vertical shaft 10, is mounted the detent 1, the free end of which projects into the path of the tooth 8 of the figure disk e. Adjustably mounted on the shaft 10, is a lever 2, which is pressed against the sector a by a spring 7.

The lever 2 moves positively with the detent 1. The latter is rigidly mounted on the vertical shaft 10, whereas the lever 2 is movable and adjustable thereon by means of screws or the like. The sector a is movably mounted on the shaft d, of the step cone, and is under the action of a spiral spring 6, which is wound around the shaft, and which tends to move the sector a into the operative position. On its front side, the sector a is provided with a cam-path 3, and a rotating flange 4, on which latter rests the end of the lever 2, which is under the action of a spring 7, and thus puts the sector out of operation and the spring 6 under tension. When the tooth 8 depresses the detent 1, the arm 2 is released from engagement with the flange 4, of the sector, and the sector is shifted into an operative position by the spring 6, and the tooth 9, of the sector, effects the transmission of tens. On the further rotation of the shaft d the cam path 3 moves over a stationary pin 5, of the plate e, and brings the sector a back into its position of rest, simultaneously tensioning the spring 6. As soon as the sector a has been moved back, the projection 2 again moves over the flange 4 and retains the segment in position of rest until a new movement is required.

I claim:—

1. A means for the transmission of tens in calculating machines comprising in combination, a sector member having a tens transmission operating portion, a spring normally acting to move the sector member into an operative position, said sector member having a cam and a retaining flange, spring controlled lever mechanism engaging said flange to normally retain said sector member in an inoperative position and maintain the spring under tension, a figure disk means for disengaging said lever mechanism from said flange to permit said sector member to be moved into an operative position by said spring, and means engaging said cam for returning said sector member to an inoperative position at the completion of its transmission movement, substantially as described.

2. A means for the transmission of tens in calculating machines comprising in combination, a sector member having a tens transmission operating portion, a spring normally acting to move the sector member into an operative position, said sector having a cam and a retaining flange, spring controlled lever mechanism engaging said flange to normally retain said sector member in an inoperative position and maintain the spring under tension, a figure disk means for disengaging said lever mechanism from said flange to permit said sector member to be moved into an operative position by said spring, and a fixed stop disposed in the path of said cam and engaging the same whereby the sector member is moved to an inoperative position at the completion of its transmission movement, substantially as described.

3. A means for the transmission of tens in calculating machines comprising in combination, an actuated sector device for effecting tens transmission, a spring normally acting to move said device into an operating position, mechanism engaging said device to hold it out of an operative position and maintaining the spring under tension, figure disk means for engaging said mechanism to permit movement of said device into an operative position, and means for returning said device to an inoperative position after the completion of the tens transmission thereby.

In testimony whereof I have hereunto set my hand in presence of two subscribing witnesses.

BERNHARD BEHR.

Witnesses:
 PAUL ARRAS,
 CLÄRE SIMON.